United States Patent [19]

Mittelhäuser

[11] Patent Number: 4,732,461
[45] Date of Patent: Mar. 22, 1988

[54] EXTERNAL REARVIEW MIRROR WITH RELEASABLE CATCH MECHANISM FOR MOTOR VEHICLES

[76] Inventor: Bernhard Mittelhäuser, Am Krähenberg, D-3002 Wedemark 2, Fed. Rep. of Germany

[21] Appl. No.: 922,708

[22] Filed: Oct. 24, 1986

[30] Foreign Application Priority Data

Oct. 29, 1985 [DE] Fed. Rep. of Germany ... 8530611[U]

[51] Int. Cl.[4] .......................... B60R 1/06; G02B 7/18; G02B 5/08
[52] U.S. Cl. ................................. 350/631; 248/475.1; 248/900; 248/549
[58] Field of Search ................ 350/631, 632; 248/549, 248/900, 475.1

[56] References Cited

U.S. PATENT DOCUMENTS 4,626,087 12/1986 Ohyama ............................. 350/632

FOREIGN PATENT DOCUMENTS

| 3033143 | 4/1902 | Fed. Rep. of Germany | 350/631 |
| 1196266 | 6/1970 | United Kingdom | 248/549 |
| 2046687 | 11/1980 | United Kingdom | 248/900 |
| 2099069 | 5/1982 | United Kingdom | 248/900 |

*Primary Examiner*—Jon W. Henry
*Attorney, Agent, or Firm*—Becker & Becker, Inc.

[57] ABSTRACT

An external rearview mirror for a motor vehicle, whereby a support serves for fastening of the mirror to the vehicle, with a mirror housing, in which is disposed a mirror body, being pivotably connected to the support, via a closed bracket, in such a way that the mirror housing can tilt or fold in the longitudinal direction of the vehicle under certain driving conditions. The support is also provided with releasable catch mechanisms for holding the mirror housing in its effective position. The pivot connections for the closed bracket are provided on the support and on the mirror housing, and are formed by catch or snap connections and/or by two sections that come together during assembly of the mirror.

10 Claims, 2 Drawing Figures

EXTERNAL REARVIEW MIRROR WITH RELEASABLE CATCH MECHANISM FOR MOTOR VEHICLES

BACKGROUND OF THE INVENTION

1. Field of the Invention

The present invention relates to an external rearview mirror for a motor vehicle, whereby a support serves for fastening of the mirror to the vehicle, with a mirror housing, in which is disposed a mirror body, being pivotably connected to the support, via a closed bracket, in such a way that the mirror housing can tilt in the longitudinal direction of the vehicle under certain driving conditions. The support is also provided with a releasable catch mechanism for holding the mirror housing in its effective position, with the catch mechanism being disengageable under the aforementioned certain driving conditions.

2. Description of the Prior Art

The plurality of joints that are provided for such a mirror require a precise, and generally time-consuming assembly, when the mirror is being assembled.

An object of the present invention is to improve a mirror of the aforementioned general type in such way that important simplifications occur during assembly of the mirror without, however, hereby adversely affecting the utility of the mirror after assembly is effected.

BRIEF DESCRIPTION OF THE DRAWING

This object, and other objects and advantages of the present invention, will be appear more clearly from the following specification in conjunction with the accompanying schematic drawing, in which.

SUMMARY OF THE INVENTION

Figure 1:
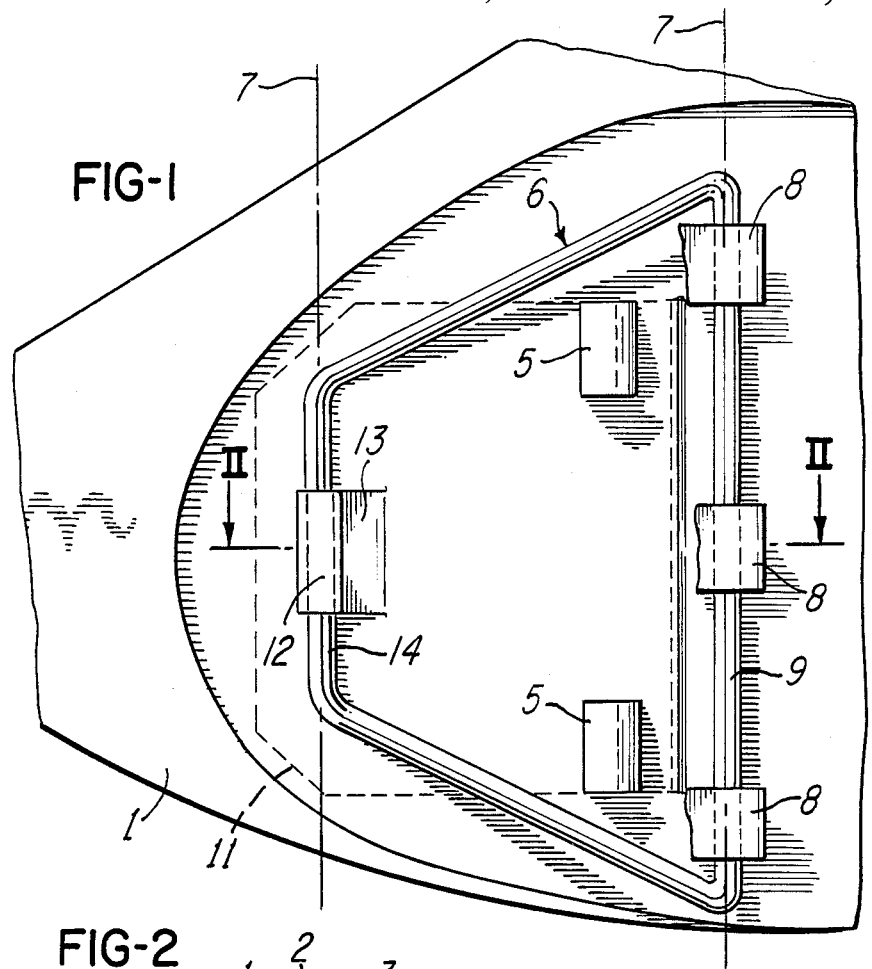
FIG. 1 is a partially broken-away view of one inventive embodiment of an external rearview mirror for a motor vehicle, and in particular perpendicular to the mirror (at right angles to the pivotably connected bracket sections), and emphasizes the pivot connections of the closed bracket that serves for the pivotable connection of the mirror housing.
Figure 2:
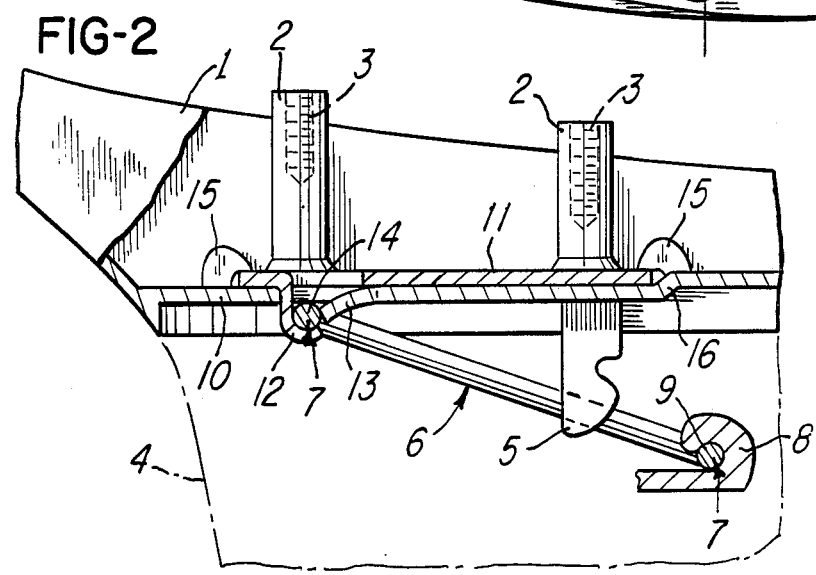
FIG. 2 is a partial cross-sectional view taken along the line II—II in FIG. 1, and again particularly emphasizes the aforementioned pivot connections.

The external rearview mirror of the present invention is characterized primarily in that the support connections for the closed bracket are catch or snap joints, and/or are formed by two sections that come together during assembly of the mirror.

Consequently, the pivot connections can be formed simply by placement or insertion of the bracket. During this placement or assembly movement (approximately at right angles) of the pertaining portion of the bracket, a small restoring force, generally in the form of spring tension, is overcome. In so doing, the bracket slides into its effective position; the pivotable connection is then produced. This snap or catch connection is preferably utilized where the closed bracket must be connected with the support, whereas the other pivot connection (connection of the bracket to the mirror housing) can also be embodied in such a way that this pivot connection results during assembly of the individual components, with structural parts that are joined forming a support section for the bracket. However, it is also possible at this portion of the bracket to form pivot connections that result from simple catch, snap, or clamping actions.

Such pivot connections are of particular significance especially for closed brackets, because such a bracket shape precludes introduction or insertion of the bracket into a support part that is, for example, in the shape of a sleeve. Thus, with the present invention, not only is assembly of the mirror accelerated, but rather it is also possible to accomplish assembly with closed, not open brackets, i.e., for example, U-shaped brackets.

Further specific features of the present invention will be discussed in detail subsequently.

DESCRIPTION OF PREFERRED EMBODIMENTS

Referring now to the drawing in detail, the support 1 of the mirror is rigidly connected to a vehicle; the mounting pins 2, which have an internal thread 3, are provided for this purpose. The support 1 serves for holding the mirror housing 4, in which the non-illustrated mirror body is located in a customary adjustable manner. The mirror housing 4 is releasably connected with the support 1 via catch mechanism means 5. Under certain, extreme conditions, this connection can disengage. So that under these conditions a tilting in the longitudinal direction of the vehicle can be undertaken, the mirror housing 4 is pivotably connected with the support 1 via a rigid, closed bracket or similar member 6; the potential tilt axes 7 extend approximately vertically.

The important thing is that during assembly, these pivotable connections are capable of being accomplished rapidly and reliably. For this reason, the mirror housing 4 is provided with hook-like retainers 8 that receive the front portion 9 of the bracket 6. The opening of the retainer 8 has an inner diameter that is less than the diameter of the bracket 6. Thus, in order to be able to achieve the effective position illustrated in the drawing, the bracket 6, during an assembly operation, must resiliently bend the hook portion in an outward direction. However, in the effective position, the portion 9 is reliably and securely surrounded to a sufficient extent.

A metal plate 11 rests against the back side of the base plate 10 of the support 1. The metal plate 11 carries the mounting pins 2, with the catch mechanism means 5 of the metal plate 11 extending through the base plate 10. The metal plate 11 is additionally provided with a bent tongue 12, which also serves as a support element. Deflected during introduction of the portion 14 of the bracket 6 is a projecting resilient tongue 13 of the base plate 10; this tongue 13 prevents an undesired slipping of the portion 14 out of the bend of the tongue 12. Accordingly, the other vertical portion, namely the portion 14, can also be secured by being introduced into its support element.

It should also be noted that the edges of the metal plate 11 are held by hook-like elements 15 that extend over these edges. The resulting secure support is possible to achieve when the metal plate 11 is pressed onto the base plate 10 because the hook-like elements 15 can temporarily be resiliently pushed back. A step or shoulder 16 on the base plate 10 precludes a sideways displacement of the metal plate 11.

The present invention is, of course, in no way restricted to the specific disclosure of the specification and drawing, but also encompasses any modifications within the scope of the appended claims.

What I claim is:

1. An external rearview mirror for a motor vehicle, wherein a support serves for the fastening of said mirror to said vehicle, with a mirror housing, in which is disposed a mirror body, being pivotably connected to said support, via a closed bracket, so that said mirror housing can tilt in the longitudinal direction of said vehicle; said support is also provided with releasable catch mechanism means for holding said mirror housing in a fixed position, with said catch mechanism means also being disengageable; said mirror further comprises:

respective pivot connections disposed on said support and on said mirror housing for pivotably supporting said closed bracket to thereby effect said pivotable connection of said mirror housing to said support, at least one of said pivot connections being formed by sections that come together during assembly of said mirror, and said pivot connection on said support comprises a first section, in the form of a flexible tongue that has a free end, and a second section in the form of a rigid, bent tongue having an opening for receiving a portion of said bracket, with said free end of said flexible tongue being disposed in front of said bent tongue opening, and being adapted to be deflected upon introduction of said portion of said bracket into said bent tongue opening.

2. A mirror according to claim 1, in which at least one of said pivot connections is formed by catch joint means.

3. A mirror according to claim 2, in which said catch joint means is in the form of at least one hook-like element that can be resiliently spread apart to receive a portion of said bracket.

4. A mirror according to claim 1, in which said support is provided with a metal plate, at least a portion of which forms at least part of that pivot connection that is disposed on said support; said metal plate is provided not only with mounting means for effecting fastening of said mirror to said vehicle, but also with said catch mechanism means for holding said mirror housing.

5. A mirror according to claim 4, in which said support is further provided with a base plate, with said metal plate, in the mounted state of said mirror, being disposed between said base plate and said vehicle.

6. A mirror according to claim 5, in which said catch mechanism means, and that portion of said metal plate that forms at least a part of said pivot connection, extend through said base plate.

7. An external rearview mirror for a motor vehicle, wherein a support serves for the fastening of said mirror to said vehicle, with a mirror housing, in which is disposed a mirror body, being pivotably connected to said support, via a closed bracket, so that said mirror housing can tilt in the longitudinal direction of said vehicle; said support is also provided with releasable catch mechanism means for holding said mirror housing in a fixed position, with said catch mechanism means also being disengageable; said mirror further comprises:

respective pivot connections disposed on said support and on said mirror housing for pivotably supporting said closed bracket to thereby effect said pivotable connection of said mirror housing to said support;

said support being provided with a metal plate, at least a portion of which forms at least part of that pivot connection that is disposed on said support; said metal plate being provided not only with mounting means for effecting fastening of said mirror to said vehicle, but also with said catch mechanism means for holding said mirror housing, said support being further provided with a base plate, with said metal plate, in the mounted state of said mirror, being disposed between said base plate and said vehicle, said base plate being in the form of a molded plastic member and including the external covering for said support; said base plate being provided with catch means to permit connection of said metal plate to said base plate.

8. A mirror according to claim 7, in which said base plate is provided with at least one shoulder to prevent shifting of said metal plate relative to said base plate when the two are connected.

9. A mirror according to claim 7, in which said catch means of said base plate is formed by hook-like elements that in the connected state extend over edges of said metal plate.

10. A mirror according to claim 7, in which at least one of said pivot connections is formed by sections that come together during assembly of said mirror.

* * * * *